Feb. 8, 1949.          L. C. STURBELLE           2,461,009
            PREPARATION OF MAGNESIUM FROM ITS ORES
Filed Oct. 12, 1942                           4 Sheets-Sheet 2
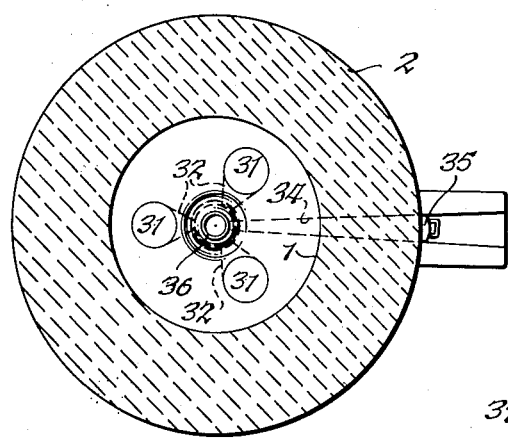
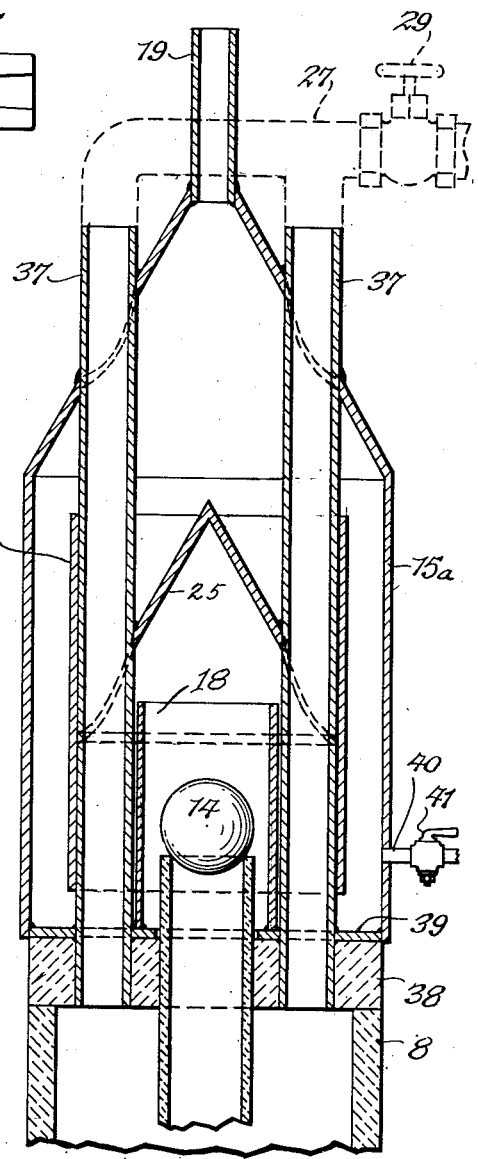
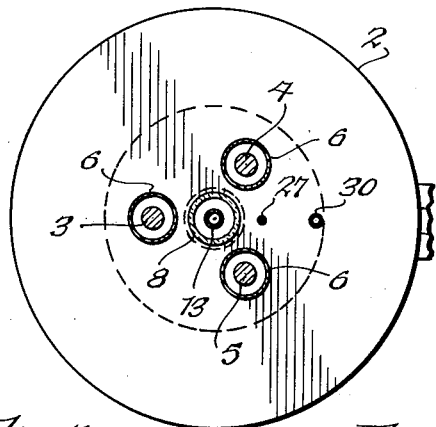
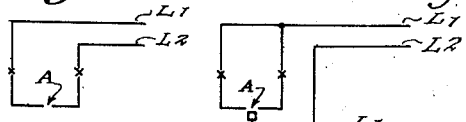
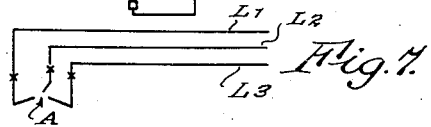
INVENTOR
Lucien C. Sturbelle
BY Parker, Prochurst & Farmer.
ATTORNEYS Feb. 8, 1949.   L. C. STURBELLE   2,461,009
PREPARATION OF MAGNESIUM FROM ITS ORES
Filed Oct. 12, 1942   4 Sheets-Sheet 3
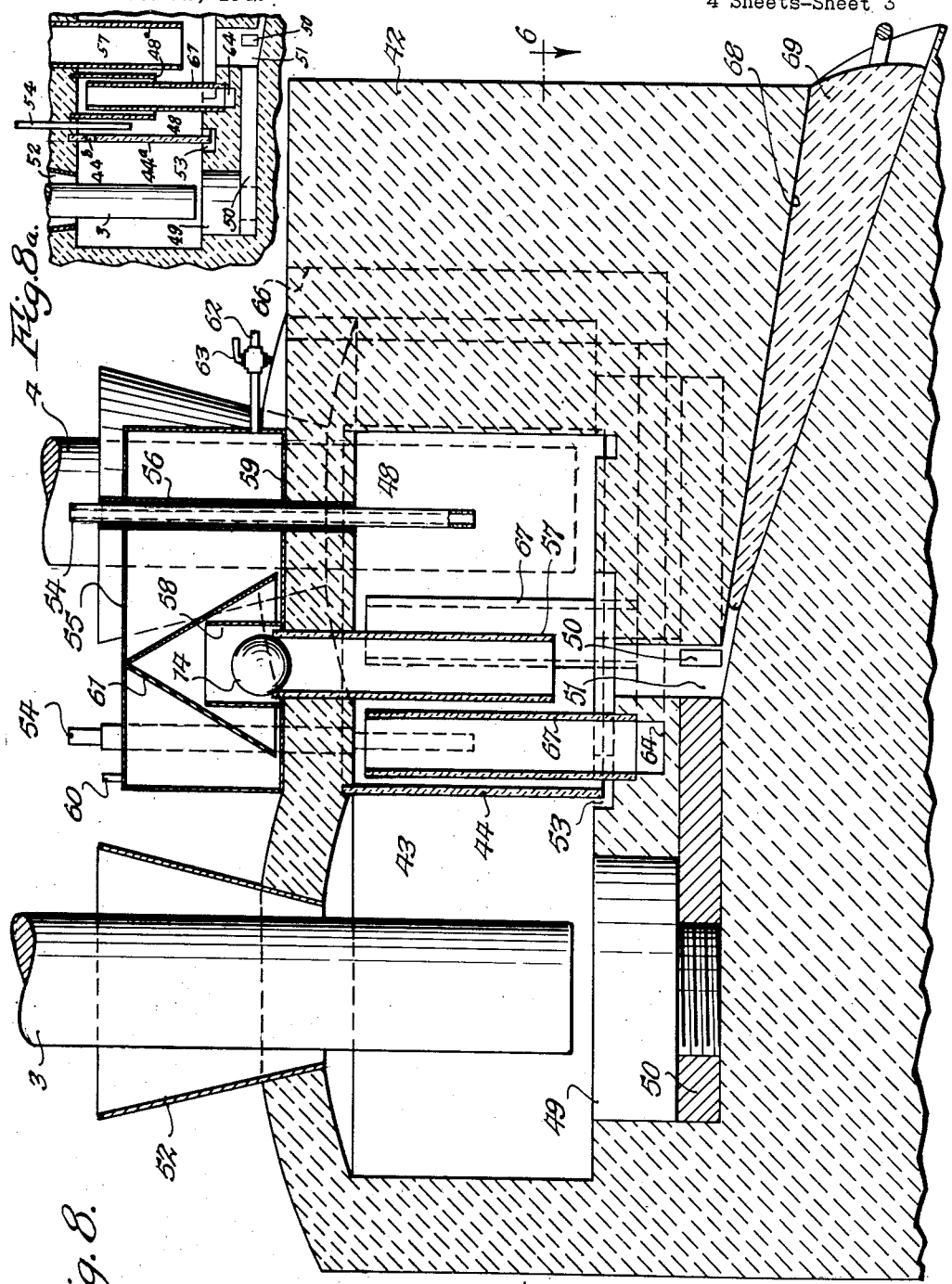
INVENTOR
Lucien C. Sturbelle
BY Parker, Rockwood & Farmer
ATTORNEYS Feb. 8, 1949.   L. C. STURBELLE   2,461,009
PREPARATION OF MAGNESIUM FROM ITS ORES
Filed Oct. 12, 1942   4 Sheets-Sheet 4
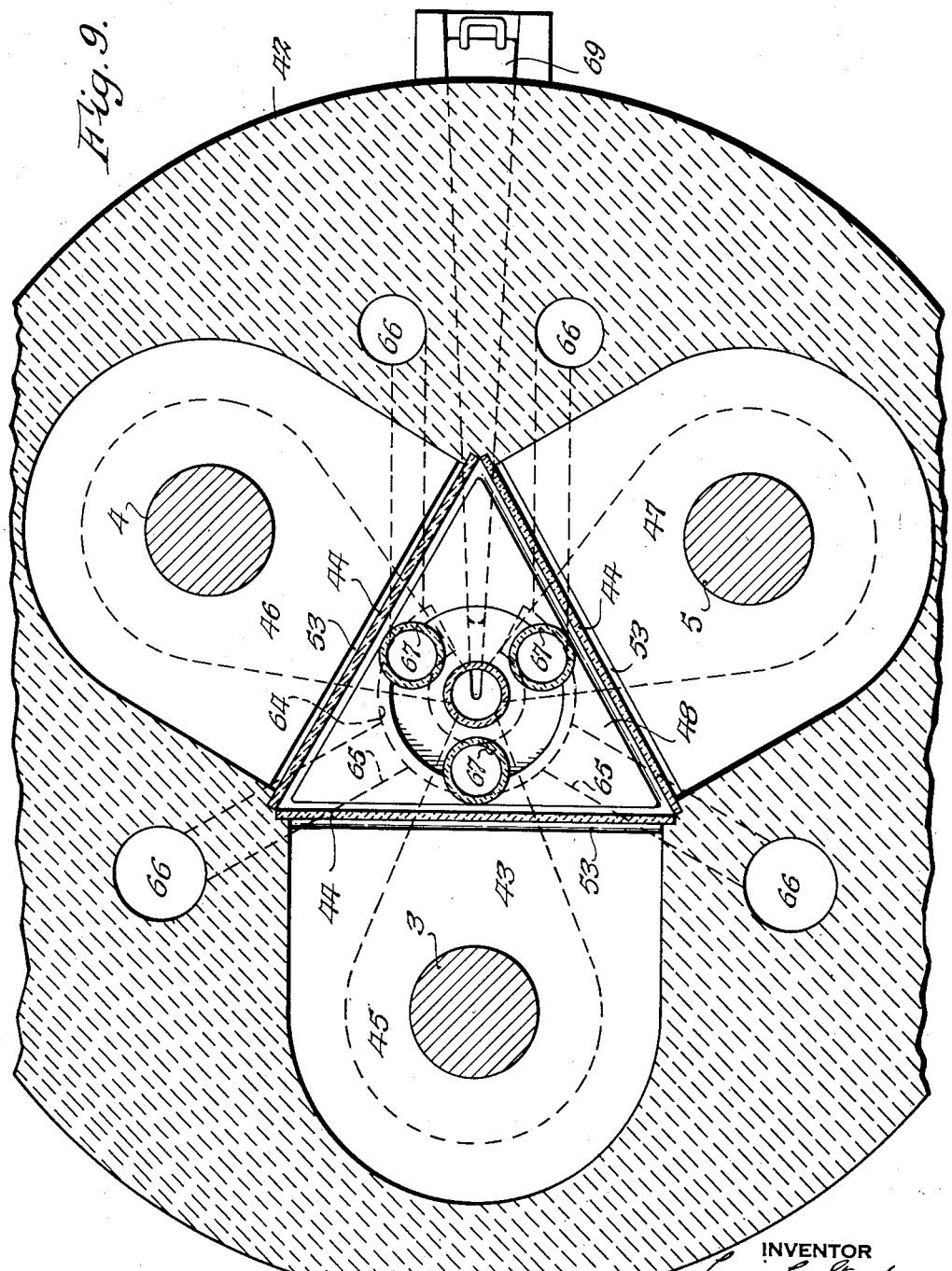
INVENTOR
Lucien C. Sturbelle
BY
Parker, Rockwood & Farmer
ATTORNEYS Patented Feb. 8, 1949

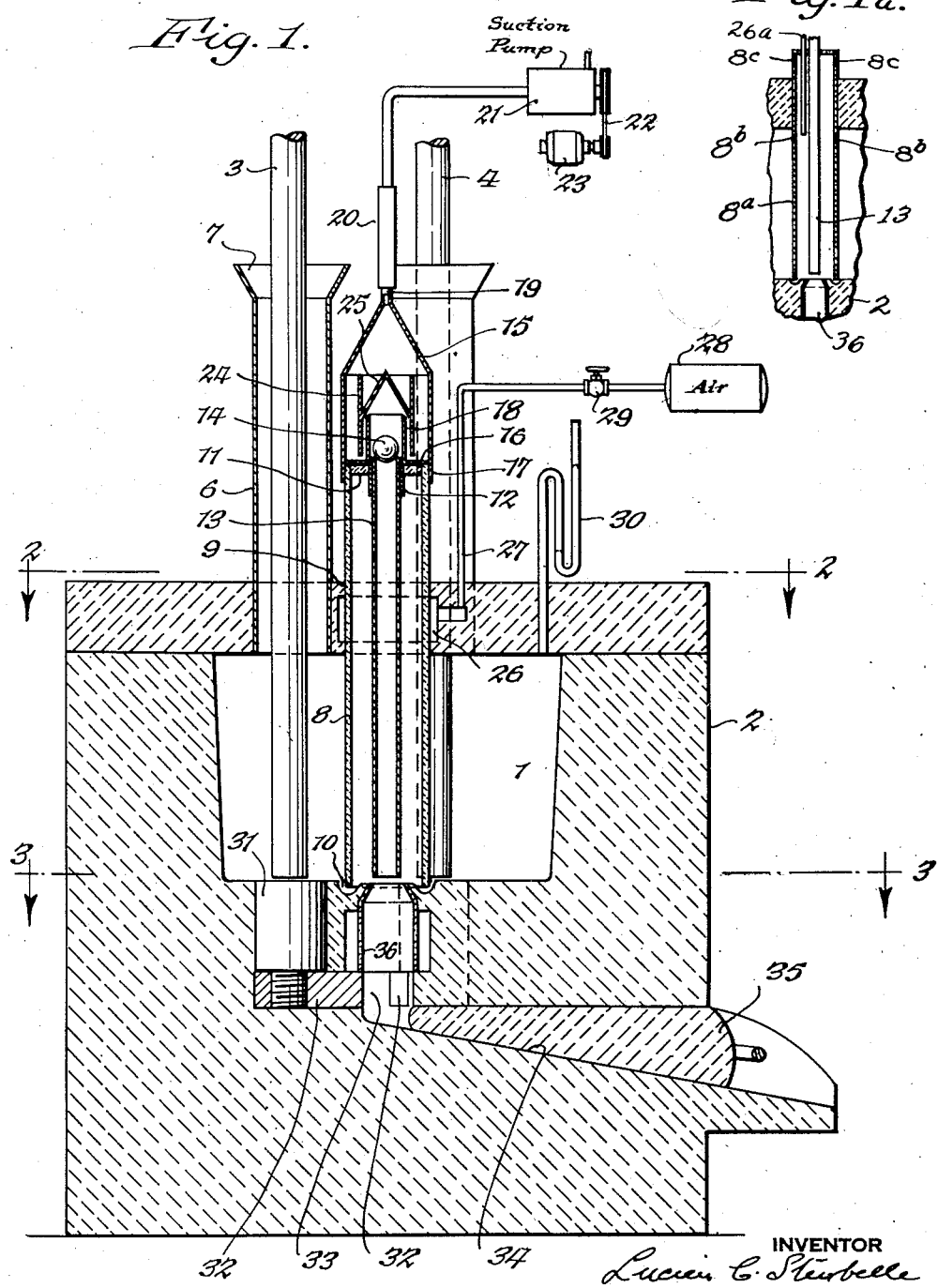

2,461,009

UNITED STATES PATENT OFFICE 2,461,009

PREPARATION OF MAGNESIUM FROM ITS ORES

Lucien C. Sturbelle, New York, N. Y.

Application October 12, 1942, Serial No. 461,654

8 Claims. (Cl. 75—67)

This invention relates to magnesium and its extraction from magnesia containing ores.

An object of the invention is to improve and simplify the extraction of metallic magnesium from magnesia containing ores.

Another object of the invention is to provide an improved method for the extraction of metallic magnesium from magnesia containing ores, which may be performed by the continuous method, which will require a minimum of power and energy when once in operation, with which the heat loss will be a minimum, which will be safe against explosion, with which the metallic magnesium may be cast directly in molds without remelting and without oxidation, and which will employ relatively simple, inexpensive and compact apparatus.

Another object is to provide an improved method for producing relatively pure magnesium in either liquid or solid form, without oxidation, rapidly, substantially continuously, and at low cost.

Other objects and advantages will be apparent from the following description of some embodiments of apparatus which may be employed for the practice of the invention, and the novel features will be particularly pointed out hereinafter in connection with the appended claims.

In the accompanying drawings:

Fig. 1 is a sectional elevation through apparatus constructed in accordance with this invention, utilizing an electric furnace and having certain auxiliary equipment shown somewhat disagrammatically;

Fig. 1a is part of a similar elevation on a smaller scale, but showing a slight modification of certain details;

Fig. 2 is a sectional plan of the same on a smaller scale, the section being taken approximately along the line 2—2, of Fig. 1;

Fig. 3 is another sectional plan of the same, also on a smaller scale, the section being taken approximately along the line 3—3 of Fig. 1;

Fig. 4 is a sectional elevation on a larger scale, through a modified form of condenser for use with apparatus like that of Fig. 1;

Figs. 5 and 6 are current diagrams of connections for a furnace with a single phase current operation;

Fig. 7 is a current diagram of the connections for a furnace using three phases current operation;

Fig. 8 is a sectional elevation through a modified form of apparatus that is also constructed for use in accordance with the invention.

Fig. 8a is part of a similar sectional elevation on a smaller scale and showing a slight modification of certain details; and Fig. 9 is a sectional plan of the same, the section being taken approximately along the line 9—9 of Fig. 8.

This invention is based upon the reversible chemical reaction between the magnesia and carbon which is:

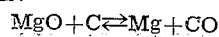
$$MgO + C \rightleftarrows Mg + CO$$

Referring to the example of apparatus for practicing the invention shown in Figs. 1, 2 and 3, the magnesia containing ore is smelted in a chamber 1 of an electric arc or resistance furnace 2 of any suitable construction. The furnace shown is formed with a base and removable top of refractory material as usual in electric arc furnaces, and is of the type which employs three (or multiples of three) electrodes 3, 4 and 5, depending into the chamber of the furnace in spaced, triangular relation to each other. These electrodes are connected to the terminals of a three phase electric power line and such a furnace is known as a three phase electric furnace. The electrodes are supported in any suitable manner, as in electric furnaces of this type, but surrounding each electrode and in spaced relation thereto is a tubular sleeve 6 which is carried by the top and extends upwardly around and spaced from the related electrode, terminating at its top in a flared mouth 7.

Also depending into the chamber through the top wall of the furnace is a porous refractory tube 8, which passes snugly through an opening 9 in the top of the furnace and extends outwardly for a substantial distance above the furnace top. Its lower end depends to the bottom of the furnace and is received in an annular, upwardly opening groove 10, which is alined therewith and formed in the bottom wall of the furnace. The tube 8, however, does not extend entirely to the bottom of the groove 10 so that there is an annular passage which extends through the groove 10 under the lower end of the tube 8. The upper end of the tube 8 is closed by an annular plug 11, and extending through and fitting an opening in plug 11 is a tubular piece 12 of metal which depends for some distance from the plug. Tightly fitted in the sleeve 12 is a non-porous pipe 13 which depends nearly the full length of the chamber of tube 8 and terminates within the tube 8 just above the bottom wall of the furnace and above the maximum expected level of molten metal on the floor of chamber 1, or in other words, a little short of the lower end of the tube 8. A ball 14 is disposed to rest upon the upper end of the tube 13 and forms a free or ball-check valve for the upper end of the tube 13.

Removably telescoping over the upper end of the tube 8 is a condenser housing 15 which may be of metal and has its bottom wall 16 recessed upwardly within the side wall so that the housing will have a depending flange 17 that telescopes over the upper end of the tube 8, with the bottom 16 resting upon the upper end of the tube 8. The bottom wall 16 has a passage therethrough surrounded by an upstanding tubular flange 18, which is alined with and larger than the pipe 13 so that it extends upwardly above the ball 14 and forms a cage therefor. The housing 15 has a conical top terminating at its upper end in a pipe 19 to which is removably connected one end of the conduit 20 leading to a suction pump 21, which is operated continuously in any suitable manner, such as by a belt 22 from a motor 23, and creates an intermittant vacuum in tube 13. Within the housing 15 of the condenser, a tubular shell 24 is mounted, to extend from approximately the lower end of the conical part of the housing to a short distance above the bottom wall 16 of the condenser housing, and surrounding and spaced from the tubular flange 18. A conical wall or partition 25 is disposed across the interior of the shell 24 intermediate between its upper and lower ends, and above and spaced from the upper end of the tube 18.

Surrounding the tube 8, within the top wall of the furnace, is a chamber 26 which communicates with a pipe 27 leading to a source of air 28 under pressure, the pipe 27 having a suitable regulating or controlling valve 29 included therein. Inasmuch as the tube 8 is of porous material, the air from the chamber 26 may pass through the tube 8 at the chamber 26 and enter the interior of the tube 8 intermediate of its ends for a purpose which will appear later herein. A liquid pressure gage 30 opens into the chamber 1 at the top of the furnace so as to indicate the air pressure within the chamber for a purpose which will be explained shortly.

Recessed into the bottom wall of the chamber 1 of the furnace 2 immediately below and in alinement with each electrode 3, 4 and 5 is a carbon or graphite foot or post 31 which is threaded into a carbon or graphite foot piece 32, the latter extending radially towards the axis of the tube 8, but with the ends of the pieces 32 nearest the axis of the tube 8 terminating from one another in the periphery of a well 33 in the bottom of the furnace. The well 33, at its lower part, opens into a discharge duct 34 leading downwardly to the side wall of the furnace 2, and is closed by a removable plug 35 of refractory material. Resting on the upper faces of the adjacent or inner ends of the foot pieces 32 is a tubular member 36 of refractory material, which extends upwardly from the well 33 through an opening in the bottom wall of the chamber 1 in alinement with the tube 13 and within the area enclosed by the annular groove 10. The upper end of the refractory member 36 is preferably made upwardly convergent or frusto conical and the portion of the furnace wall against which this frusto conical top of the tube 36 abuts is made similarly frusto conical, so that the tube 36 will fit the opening to the well in the bottom wall of the chamber 1.

It will be understood that electrodes 3, 4 and 5 may be adjusted vertically in the usual manner, and they are made of the usual electrode material as employed for electric furnaces. The lower ends of the electrodes normally terminate somewhat above the upper ends of the posts 31 so as to form gaps at the bottom of the chamber 1 for creating arcs.

The ore containing the magnesium compounds also contains other metals, such as iron, silicon, aluminum and titanium in the form of oxides, hydrates, carbonates, silicates or aluminates. This ore, when broken up into relatively small particles, is mixed with carbon in small particles, and the mixture is then introduced into the charging magazines 6 through the flared, open mouths 7 thereof to fill the chamber 1 and also to some extent fill the tubes 6. The tubes 6 act as magazines to keep the furnace chamber 1 filled during smelting and withdrawal of the molten mixture, and to restrict escape of gases from chamber 1. The carbon may be of any suitable form commonly used as a reducing agent in furnaces, and may be coal, charcoal, or any other form of carbon or similar reducing material.

The heat developed in the charge within the chamber 1 of the furnace, due to the passing of the current between the electrodes and the foot pieces 31 and 32 may cause a smelting of the ore and the reduction of at least some of the metals thereof, including the magnesium, through reaction of the oxides of the metals with the carbon. The carbonates and hydrates are by heat reduced to oxides through the elimination of carbon dioxide and moisture, and the oxides of the metals are reduced to metallic form and carbon monoxide to some extent by the carbon, which reduced metal mixture is in molten form resting on the bottom of the chamber 1. This molten mixture flows through the passage provided by the annular groove 10 under the end of the porous refractory tube 8 and overflows the upper end of the tubular refractory member 36 into the well 33 between the radially inward ends of the foot pieces 32. The current passing between the foot pieces 32 and this molten metal or material in the well 33 causes a whirling of the molten metal or material with resulting agitation thereof, owing to the fact that the current in passing through this molten metal encounters resistance and tends to whirl or cause eddying of the molten material of well 33. The magnesia in the ore which is reduced in the chamber 1 is reduced to metallic magnesium with elimination of carbon monoxide, the reaction being $MgO + C \rightleftharpoons Mg + CO$. This reaction is reversible, but at the temperature of the furnace, which is above 1200° C., the reaction goes largely to the right and the magnesia or magnesium oxide reacts with the carbon of the charge and is reduced to pure metallic magnesium and carbon monoxide. At the temperature of the furnace, however, the magnesium is a vapor mixed with the carbon monoxide.

The smelted metal which passes through the annular groove 10 is retained sufficiently in the groove 10 to form a liquid seal for the lower end of the tube 8. Consequently, these vapors of magnesium and carbon monoxide cannot escape into the tube 8 through the lower end thereof because of the liquid seal 10, nor can they escape upwardly to any extent through the hopper tubes 6 because the latter are filled with this finely divided charge of ore and carbon. A slight pressure is therefore created by these vapors in the furnace chamber 1, the amount of the pressure being shown by the pressure gage 30. The result is that the vapors of magnesium and carbon monoxide pass through the porous walls of the tube 8. This is a filtration at high temperatures. These vapors which enter the tube 8 are met by air entering the tube 8 at the chamber 26, and the air that was preheated in the chamber 26 will immediately burn the carbon monoxide to carbon dioxide with production of heat which is radiated back through the wall of the tube 8 to the charge in the furnace 1.

The magnesium is also burned, by some of this admitted air, to magnesium oxide or magnesia, which is a powder and falls to the bottom of the tube 8 and floats upon the molten metal enclosed by the lower end of the tube 8. The powdered magnesium oxide accumulates to some depth in the bottom of the tube 8, above the lower end of tube 13, and prevents the escape of carbon dioxide gas through the lower end of the tube 13, so that the carbon dioxide which is formed in the tube 8 rises therein above the top of the furnace and passes through the upwardly projecting and outwardly exposed discharge portion of the porous wall of the tube 8, and escapes to the atmosphere in proximity to the tube 6, so that some of the heat thereof is conducted through the tubes 6 to the charge therein.

It will, of course, be understood that the electrodes 3, 4 and 5 also become very hot during the operation of the furnace, and the charge moving along these electrodes through the tubes 6 will be similarly heated, which is a heat exchange that cools the electrodes and preheats the charge entering the furnace chamber 1. The amount of air admitted to the tube 8 for this purpose is regulated by the valve 29, and the pressure of the air in source 28 need not be large. At the same time the motor 23 is operating the pump 21 which is connected to the upper end of the condenser housing 15, and the suction in the housing 15 causes the ball 14 to be lifted from its seat on the upper end of the pipe 13 and creates a small suction at the lower end of the pipe 13 close to but just above the liquid level of molten metal on the bottom wall of the chamber 1.

The magnesium oxide or magnesia which falls as a powder to the bottom of the tube 8 reacts with, and is reduced to metallic form by the molten metal on the bottom of the chamber 1 within the tube 8, and also within the well 33 where the molten metal is being whirled or agitated by the electric current passing through the furnace. This reduced metallic magnesium at the temperature of the molten metal and of the furnace is a vapor, and is removed as rapidly as formed by the suction pipe 13 to the condenser 15. The layer of magnesium oxide prevents escape of the magnesium vapor back into tube 8, but if any did so escape, it would be burned to oxide again and fall on the bottom of the chamber of tube 8. The condenser 15 is outside of the furnace and at a much lower temperature, so that the magnesium vapor drawn therethrough is condensed to liquid magnesium, and this condensed magnesium collects in the bottom of this condenser.

The ball valve 14 prevents the entrance of air by reverse flow into the tube 13. While any pump 21 may be employed to create the vacuum, or any other source of vacuum may be provided, the intermittent pump, such as a reciprocating pump, is advantageous, in that the intermittent suction created by it causes an intermittent agitation of the molten metal at the lower end of the tube 8 and in the well 33, which agitation increases the reducing reaction between the powdered magnesium oxide and the molten reduced metal on which it is floating. In order to keep the condensed metallic magnesium from oxidizing in the housing 15, I provide in this housing a mass of suitable molten material, such for example as salts of the type of magnesium chloride (MgCl₂), sodium chloride (NaCl), calcium chloride (CaCl₂), or a mixture of any of these. The temperature of this material is kept between 700° and 900° C. In this particular example, these materials are liquid in this temperature range, which also is the temperature range at which the magnesium vapors will be condensed to liquid form, but not to solid form. The magnesium vapors in passing or bubbling through this liquid bath of molten salts or material in the condenser will be also condensed to liquid form, and being of lesser density than these molten materials, the condensed magnesium will float upon this molten material or mixture in the condenser. These molten materials provided in the condenser also preferably have the property of providing the condensed liquid magnesium with a protective coating which excludes air, and therefore, the magnesium does not oxidize to any great extent as it accumulates in the condenser. Some of the magnesium vapors may pass the liquid and be condensed in the upper part of the condenser 15, and will fall down upon the top 25 for the shell 24, but much of the condensed magnesium will collect in the annular space between the tube 24 and the outer housing of the condenser 15. The suction will tend to pull most of this molten material upwardly in the annular space between tube 24 and the peripheral wall of the condenser 15, with the magnesium vapors bubbling therethrough. When a sufficient quantity of magnesium has collected in this condenser, the tube 20 may be removed, the condenser lifted from the tube 8, and the condensed magnesium poured out through the pipe 19 until the molten mixture of chloride appears, whereupon the condenser 15 is brought back to vertical position and replaced on the tube 8. When the condenser 15 is removed in this manner, the ball 14 remains on the upper end of the tube 13 to prevent entrance of air into the tube 13.

When the liquid magnesium is removed from the condenser 15, or is poured out or withdrawn, it carries with it a film of the molten salts from the condenser, which prevents oxidation of the magnesium. The metal remaining at the bottom of the furnace in the well 33 is principally iron mixed with oxides of other metals, and this metal is withdrawn from time to time through the passage 34 by removing the plug 35.

Referring now to Fig. 4, the condenser there shown is similar to the condenser of Figs. 1 to 3, except that one or more pipes 37 pass downwardly through the conical top of the condenser 15a and pass through the top 38 which closes the upper end of the porous tube 8, so as to communicate with the interior of the tube 8. The pipes 37 are connected to the pipe 27, controlled by the valve 29, which leads to the source of air under pressure. The air passing downwardly through the condenser housing 15a into the upper end of the tube 8 will be preheated so that it more readily burns the carbon monoxide and the magnesium vapors in the tube 8, but this preheating of the air in this manner also serves to extract heat from the magnesium vapors in the condenser, and thus aids in condensing those vapors.

The housing 15a may have at the top level of the molten chlorides, an outlet pipe 40 controlled by a valve 41 of any suitable type, so that after the liquid magnesium has accumulated to a desired extent, it may be withdrawn through the pipe 40 without removing the condenser from the top of tube 8.

In the modification shown in Fig. 1a, the furnace and related construction are similar to the constructions shown in Figs. 1, 2 and 3, except for slight changes. The tube 8 is replaced by a tube 8a, which may be non-porous, but which has one or more small openings 8b therein, near the top of the chamber 1, by which the carbon monoxide gas and magnesium vapors may pass from the smelting chamber to the interior of the tube 8a. The air inlet pipe 26a terminates at its open end near openings 8b. The tube 8a, at its end above the furnace, is provided with one or more escape openings 8c by which the carbon dioxide formed in tube 8a may escape. Otherwise the construction and operation are as described for Figs. 1, 2 and 3.

Referring now to the embodiment of the invention shown in Figs. 8 and 9, the furnace 42, of any suitable construction, has electrodes 3, 4 and 5 similar to those in the furnace of Figs. 1 to 3. Disposed across this chamber 43 are three plates 44 of porous refractory material, similar to the material of the tube 8, and which take the place of the tube 8. These plates 44 divide the chamber 43 into four sub-chambers 45, 46, 47 and 48. The chamber 48 is the chamber enclosed between the plates 44 and corresponds to the chamber of the tube 8 in Figs. 1 to 3. Each of the chambers 45, 46 and 47 has in its bottom wall beneath and alined with the electrode of that chamber, an electrode post 49 which is similar to the post 31 of Fig. 1, and which is threaded into a foot piece 50 which is similar to the foot piece 32 of Fig. 1. These foot pieces 50 extend radially toward one another through the body of the refractory material of the furnace to the periphery of a well 51 below the chamber 48 and which corresponds to the well 33 of Fig. 1. Each of the sub-chambers 45, 46 and 47 has a hopper 52 opening downwardly through the top thereof into the smelting chamber and around the electrode, and extending upwardly above the top to serve as a magazine surrounding the electrode for feeding the loose charge into the smelting chamber and serve as a movable stopper for preventing the escape of the carbon monoxide and magnesium vapors that are formed by the reaction in the smelting chamber.

These plates 44 depend into recesses 53 which run in the same direction as their lower edges, and which serve to pass molten metal from each of the chambers 45, 46 and 47 into the chamber 48 beneath the plates 44 in the same way that the annular groove 10 of Fig. 1 passes the molten metal into the chamber of the tube 8. The air for burning the carbon monoxide and magnesium vapors which pass through the porous plates 44 from the smelting chambers 45, 46 and 47 is admitted to the chamber 48 by one or more pipes 54 which pass downwardly through a condenser box 55 mounted on the top of the furnace and into the chamber 48. For each pipe 54, the condenser box 55 has a tube 56 passing therethrough from end to end and forming a tight connection with the top and bottom thereof, and also downwardly through the top of the furance wall. Each tube 54 is connected at its outer end to a source of air under pressure, such as the pipe 27 of Fig. 1. Also carried by the top of the furnace and depending into the chamber 48 between the plates 44 is a non-porous refractory tube 57 which corresponds to the tube 13 of Fig. 1. This tube 57 terminates just above the expected level of molten metal in the chamber 48 and just above the upper open end of the well 51 and alined therewith.

It may be noted that the opening from the well into the chamber of the tube 8 or into the chamber 48 may be smaller than the lower end of the tube 13 or the tube 57, so that a maximum amount of the magnesium vapors rising from the well will pass through the suction tube to the condenser. The tube 57 passes upwardly through the top of the furnace wall and at its top supports a ball 14 that forms a check valve. The ball 14 is held against lateral displacement to any great extent by a tube or cage 58 extending upwardly from the bottom wall 59 of the condenser box 55. The condenser box is provided with a pipe 60 at its top which corresponds to the pipe 19 of Figs. 1 to 3, and the pipe 60 is thus connected to the pump 21 which provides a small vacuum for the interior of the condenser box 55. A conical baffle 61 is disposed over the top of the upstanding tube 58 so that the vapors passing upwardly through the tube 58 from pipe 57 will be deflected downwardly to the bottom of condenser box below the level of molten salts therein, it being understood that the baffle 61 terminates slightly above the bottom of the condenser box along much of its lower edge. This condenser box is also provided with a substantial layer of molten salts as a protective material, such as the chlorides mentioned for use in the condenser box 15 of Fig. 1, and the level of such salts extends above the lower edge of the baffle 61 so as to form a liquid seal through which the vapors are bubbled as they enter the condenser box.

A discharge pipe 62 controlled by a valve 63 leads from the condenser box 55 at a level which enables the condensed magnesium to be withdrawn in liquid form and discharged into molds at intervals without withdrawing the box 55 from its position on the top of the furnace. The body of the furnace is provided, in the bottom wall of the chamber 48, with a passage 64, Fig. 9, which preferably is less than a circle or crescent-shaped, so as to largely surround the well 50 but be out of communication therewith, and branches 65 lead therefrom to flues 66 which extend upwardly to the top of the furnace for the discharge of gases, as will be explained shortly. The passage 64 opens upwardly into the chamber 48 at three positions in this particular example, and over each opening is supported an upstanding tube 67 of non-porous refractory material which extends nearly to the top of the chamber 48 and forms an entrance to passage 64 only at the top of chamber 48, the upper end of each of these tubes 67 opening into the chamber 48.

The operation of the embodiment of the invention shown in Figs. 8 and 9 is generally similar to that shown for the embodiment shown in Figs. 1 to 3. The charge of ore containing magnesia in finely divided form and mixed with a reducing agent, such as carbon, is discharged into the smelting chambers 45, 46 and 47 through the magazine hoppers 52, so that the charge will always extend up into the hopper 52 sufficiently to close the hopper against the escape of much gas. The furnace is started with an arc between the electrodes and the posts 49 beneath the same, which creates sufficient heat to smelt the surrounding charge and reduce the metals with the accompanying formation of carbon monoxide and magnesium vapors. The monoxide and the magnesium vapors pass through the porous walls 44 into the chamber 48 because there is a small pressure in the chambers 45, 46 and 47, and the gases and vapors cannot escape through the hoppers 52 without considerable resistance, and the groove 53 is closed by the molten metal. The air introduced through the pipe 54 is preheated by heat exchange with the condenser box 55, and it causes a burning in the chamber 48 of the carbon monoxide to the carbon dioxide and the burning of the magnesium vapors to magnesium oxide.

The carbon dioxide is withdrawn from the top of the chamber 48 through the tubes 67 and carried out through the flues 66 to the atmosphere, and the magnesium oxide formed by the burning of the magnesium vapors drops as a powder to the chamber 48 and floats upon the thin level of molten reduced metal in that chamber, where a reaction takes places that causes the magnesium oxide to be reduced to pure magnesium and vaporized at the furnace's temperatures. The powdered magnesium oxide floating on the molten metal and around the lower end of tube 57 prevents the escape of the magnesium vapors created at the surface between the layer of powdered magnesium oxide and the molten metal, and such vapors are then removed through the tube 57 by the suction created in the condenser box 55. The vapors so removed are condensed in the box 55 to liquid magnesium and coated simultaneously with a protective layer of the molten chlorides or salts contained in the bottom of the condenser box, and this liquid pure magnesium can be withdrawn at intervals without oxidation thereof, directly into molds. The molten metal in the bottom of chamber 48 is withdrawn from the well 51 at intervals through the outlet duct 68 upon removing the plug 69.

In the modification shown in Fig. 8a, the furnace and related construction are similar to those shown in Figs. 8 and 9 except for slight changes. The plates 44 are replaced by plates 44a similar thereto except that they may be non-porous and have apertures 44b near the top of the furnace. Air is admitted to chamber 48 as in Figs. 8 and 9, but a tube 48a that may be non-porous is secured to the top wall of the furnace and extends downwardly therefrom for a substantial distance in spaced relation to each of the upstanding tubes 67, so that the carbon dioxide must travel in a tortuous path downwardly and then upwardly to reach the entrance to tubes 67 leading to exhaust. The magnesia formed by burning the magnesium vapors with the admitted air settles to the bottom of chamber 48 by gravity and is separated from the carbon dioxide by inertia and gravity. Otherwise the construction and operation are as described for Figs. 8 and 9.

The electric connections to the electrodes may be as shown in Fig. 7 for the three phase current operation, but for furnaces for use on single phase the connections may be as shown in either Fig. 5 or Fig. 6. In Figs. 5, 6 and 7, the arc is shown by the X, and the completion of the circuit by the conducting material in the well 33 of Fig. 1 or 51 of Fig. 8, is designed by the gap A. In Fig. 6, the two electrodes may be connected to the same line wire and a contact in the well connected to the other line wire.

The furnace may be started in any suitable manner, or some conducting material, such as carbon or a metal such as iron, may be introduced into the furnace where it collects in the well 51 of Fig. 8, and the well 33 of Fig. 1. An arc is then formed between each electrode and its foot piece, and then the charge introduced. The intermittent suction in pipes 13 and 57 (Figs. 1 and 8), aids in the agitation of the molten metal within the chamber of the tube 8 of Fig. 1 and the chamber 48 of Fig. 8, so as to accelerate the reduction of the magnesium oxide powder by the molten reduced metal at the bottom of the furnace within the chamber 48 of Fig. 8 of the chamber of tube 8 of Fig. 1.

It will be understood that much of the heat which is created by the electric arc to reduce all of the metals is returned to the furnace by the burning of the carbon monoxide and of the magnesium vapors, owing to the fact that all of the metals, with the exception of magnesium, are largely oxides again at the end of the process as they are withdrawn from the furnace. Most of the heat units developed by the combustion of the carbon monoxide are recovered within the tube 8 of Fig. 1 or the chamber 48 of Fig. 8 and, consequently, are retained in the furnace to aid in further fusing the charge which is delivered through the feeding magazines. The heat usually lost through the electrodes is recovered through the preheating of the charge as it enters the furnace through the magazines, and this preheating of the charge also aids in eliminating moisture, and decomposing the hydrates and carbonates of the charge before the charge reaches the fusion zone of the furnace. It is not necessary to give the ore or charge a preliminary treatment or calcining to eliminate moisture or to reduce the carbonate to an oxide. The presence of moisture does not interfere. It will be noted that the furnace works under a slight pressure in the smelting or reacting chamber so that it is safe against explosions. The only vacuum occurs in the condenser and in the tube 13 of Fig. 1 and the tube 57 of Fig. 8, where there is no other combustible vapor except the magnesium, and no air. By forcing the magnesium vapors to pass through the molten material, such as the chlorides, bromides, or fluorides in the condenser, the metal is coated with a film of those salts and can be easily passed into the molds without oxidation. No remelting is necessary.

The temperature of the molten mixture of the charge in the furnace usually varies from 1300° to 1600° C., whereas the temperature in the condenser box is around 700° to 900° C., which is below the temperature at which the magnesium vapors condense to a liquid, but above that temperature at which the liquid magnesium solidifies. While electric furnaces are particularly adaptable and advantageous for smelting the ore, it will be understood that other means to smelt the ore may be employed in place of the electric furnace, especially since very little outside heat is required after the operation is in progress.

Porous refractories are available in the open market and one may also obtain non-porous refractories, but, as a matter of record, a non-porous refractory may be made by taking an ordinary porous refractory and painting the surface of such refractory article with zircon or zirconium silicate. The zirconium silicate is finely divided and made into a paste which is painted on the surface. It is then allowed to dry, after which the article is baked.

I may also advantageously add bauxite or some aluminum compound to the mixture of the charge in order that the charge may contain more iron or aluminum, which is advantageous in maintaining the desired balance of heat in the reactions.

The molten material to be used in the condenser may be of any material which has a fusion temperature in the desired range, and which provides a protective coating for the molten magnesium, and while I have mentioned salts such as the chlorides, bromides and fluorides as suitable for this purpose, it will be understood that these materials are examples commonly available and which, at the present time, appear to be preferable. For example, heavy metal chlorides or even organic chlorides may be suitable for this purpose. Since such materials do not enter into the reactions involved in this invention, I contemplate using any of such materials which have the desired fusion temperature and which are inert to the magnesium, and preferably which form a protective coating thereon.

It will be understood that various changes in the materials, details and arrangements of parts, which have been herein described and illustrated in order to explain the nature of the invention, may be made by those skilled in the art within the principle and scope of the invention as expressed in the appended claims.

I claim as my invention:

1. The method of producing metallic magnesium from its ore, which comprises smelting said ore with carbon, removing the carbon monoxide and magnesium vapor released thereby into a separate chamber, there oxidizing the carbon monoxide to carbon dioxide and the metallic magnesium to magnesia, separating the carbon dioxide and magnesia, reducing the separated magnesia so obtained to magnesium by reaction with that part of the reduced smelted ore including the silicon thereof which will reduce magnesia under conditions which vaporize the magnesium so obtained, and condensing the magnesium vapors so obtained with a minimum of oxidation thereof.

2. The method of producing metallic magnesium from its ore, which comprises smelting said ore with carbon, removing the carbon monoxide and magnesium vapor released thereby into a separate chamber, there oxidizing the carbon monoxide to carbon dioxide and the metallic magnesium to magnesia, separating the carbon dioxide and magnesia, reducing the separated magnesia so obtained to magnesium by reaction with that part of the reduced smelted ore including the silicon thereof which will reduce magnesia under conditions which vaporize the magnesium so obtained, condensing the magnesium vapors to molten metallic condition, coating the molten magnesium as it condenses with an adherent, protective, molten material, and then cooling the protected molten magnesium to solid form.

3. The method of producing metallic magnesium from its ore, which comprises smelting said ore with carbon, removing the carbon monoxide and magnesium vapor released thereby into a separate chamber, there oxidizing the carbon monoxide to carbon dioxide and the metallic magnesium to magnesia, separating the carbon dioxide and magnesia, reducing the separated magnesia so obtained to magnesium by reaction with that part of the reduced smelted ore including the silicon thereof which will reduce magnesia under conditions which vaporize the magnesium so obtained, bubbling the magnesium vapors so obtained through a molten material at a temperature which condenses the vapors to liquid magnesium and which material forms a protective coating on the liquid magnesium and has a greater density when liquid than liquid magnesium, and then separating off the liquid magnesium with its protective coating.

4. In a process of recovering magnesium from its ores, the steps of reducing with heat and carbon and fusion a quantity of magnesium ore at a sufficiently high temperature to cause the concurrent volatilization and distillation of metallic magnesium so produced, filtering the metallic distillate to separate it from the zone of initial fusion, simultaneously oxidizing such filtered distillate to form magnesium oxide and inert oxides of gases also passing the filtration step, thereby to effect the separation of the magnesium bearing constituent of the filtrate from impurities such as elemental carbon, and thereafter recovering the purified magnesium oxide.

5. The method of producing metallic magnesium from its ore, which comprises smelting said ore with intermixed carbon to form a vapor of magnesium and carbon monoxide, separating the magnesium from the vapor as magnesium oxide, reducing the newly formed magnesium oxide with silicon of the reduced ore to form silica and magnesium, and then removing the magnesium as a vapor by suction from the silica and then condensing the magnesium.

6. The method of producing metallic magnesium from its ore which comprises progressively smelting said ore with intermixed carbon at a temperature above 1200° C. to form a vapor mixture of magnesium and carbon monoxide, converting the magnesium to an oxide to separate it from the carbon monoxide, then reducing the magnesium oxide to metallic form by reaction with the reduced ore including silicon from said smelting, and removing the metallic magnesium as a vapor from the reduced ore with which it reacted.

7. The method of producing metallic magnesium from its ore, which comprises reducing said ore with carbon at a temperature above 1200° C. to form a vapor containing magnesium and carbon monoxide, separating the magnesium vapor from the carbon monoxide vapor by converting the magnesium to an oxide, and then reducing the separated magnesium oxide so obtained to metallic form and vapor phase by contact with the reduced ore of said smelting, including the silicon thereof, and condensing the vapor of metallic magnesium under non-oxidizing conditions.

8. The method of producing metallic magnesium from its ore which comprises reducing said ore, with carbon, to metallic condition in an atmosphere free of any added inert gases, and at a temperature above 1200° C. to form a vapor of metallic magnesium and carbon monoxide, converting the magnesium vapor to an oxide, and separating such magnesium oxide from the carbon monoxide, then reducing the separated magnesium oxide to metallic form by reaction with the reduced ore obtaining from said smelting including the silicon therein, and removing the last reduced metallic magnesium as a vapor.

LUCIEN C. STURBELLE.

(References on following page)

REFERENCES CITED

The following references are of record in the file of this patent:

UNITED STATES PATENTS

| Number | Name | Date |
|---|---|---|
| 1,748,805 | Stansfield | Feb. 25, 1930 |
| 2,003,487 | Hansgirg | June 4, 1935 |
| 2,118,973 | Hansgirg | May 31, 1938 |
| 2,126,825 | Seliger | Aug. 16, 1938 |
| 2,219,059 | Suchy et al. | Oct. 22, 1940 |
| 2,229,716 | Blackwell et al. | Jan. 28, 1941 |
| 2,247,334 | Keemle | June 24, 1941 |
| 2,255,549 | Kruk | Sept. 9, 1941 |

FOREIGN PATENTS

| Number | Country | Date |
|---|---|---|
| 479,842 | Great Britain | Feb. 7, 1938 |

OTHER REFERENCES

The "Technology of Magnesium and Its Alloys," published in 1940 at London by Beck, page 3.

The Waelz Process, Technical Publication No. 69, by the American Institute of Mining and Metallurgical Engineers, Inc. Issued with Mining and Metallurgy, Feb., 1928.